Jan. 30, 1951  G. C. SONTAG ET AL  2,539,676
PHOTOGRAPH EXHIBITOR
Filed Feb. 14, 1947  4 Sheets-Sheet 1

INVENTORS
GEORGE C. SONTAG
RAY M. WICK
BY
ATTORNEYS

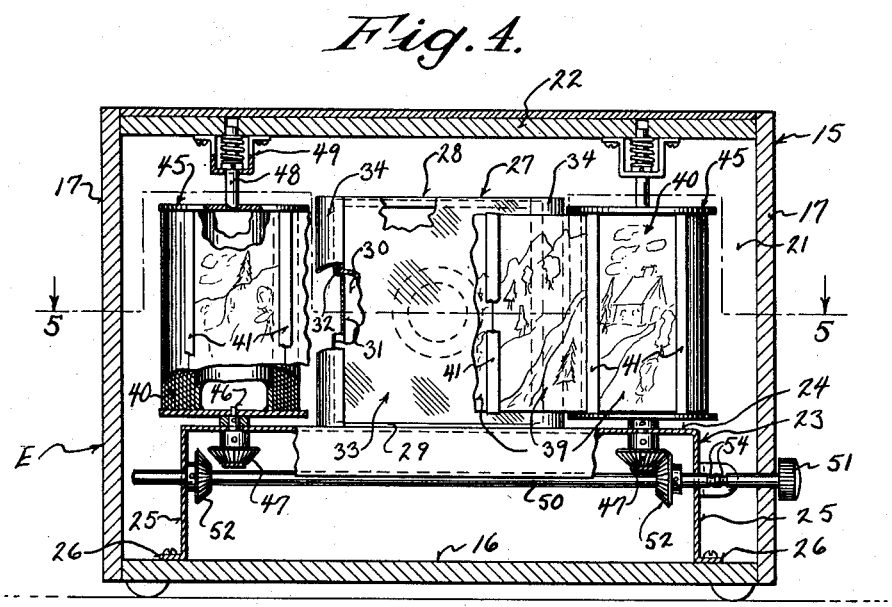
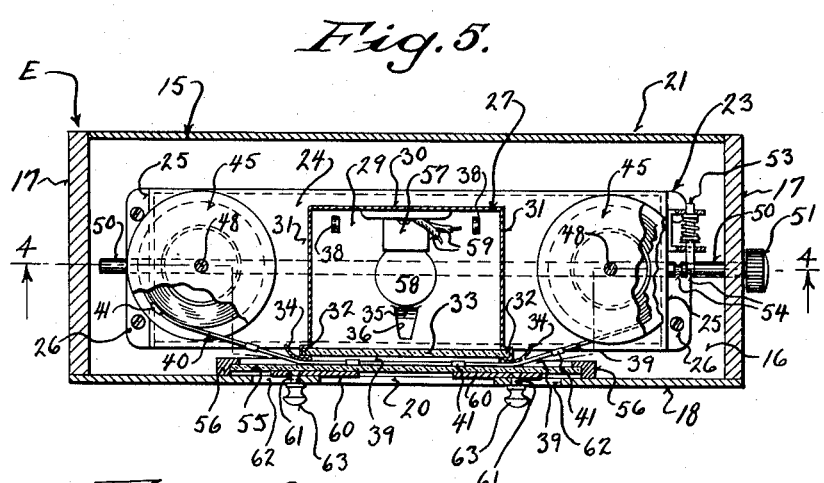
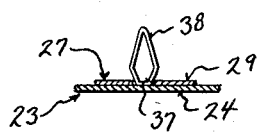

Jan. 30, 1951 G. C. SONTAG ET AL 2,539,676
PHOTOGRAPH EXHIBITOR
Filed Feb. 14, 1947 4 Sheets-Sheet 3
Fig. 7.
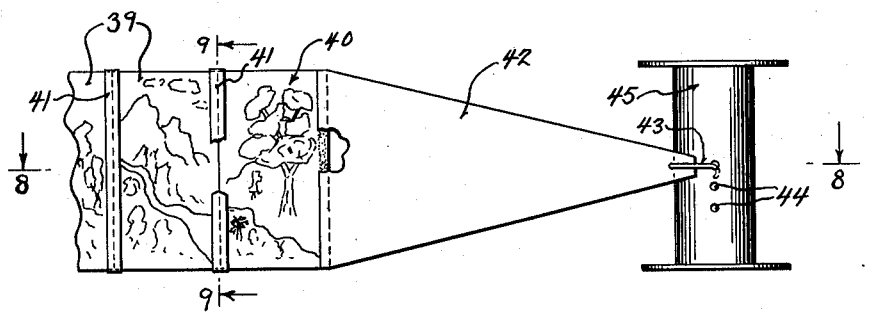
Fig. 8.
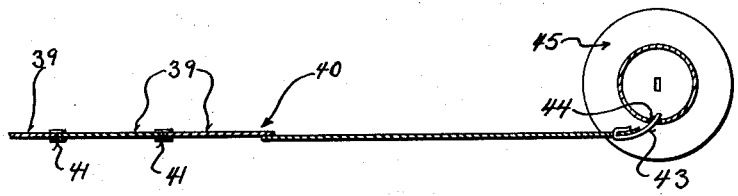
Fig. 9. Fig. 10.
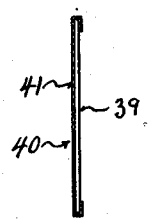 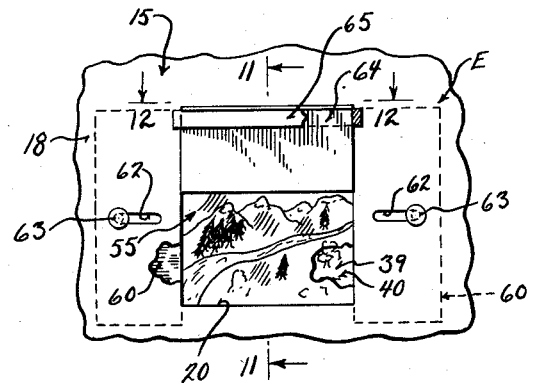
Fig. 11.
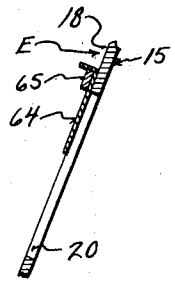
Fig. 12.
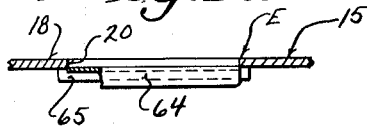
INVENTORS
GEORGE C. SONTAG
RAY M. WICK
BY
ATTORNEYS Jan. 30, 1951 G. C. SONTAG ET AL 2,539,676
PHOTOGRAPH EXHIBITOR
Filed Feb. 14, 1947 4 Sheets-Sheet 4
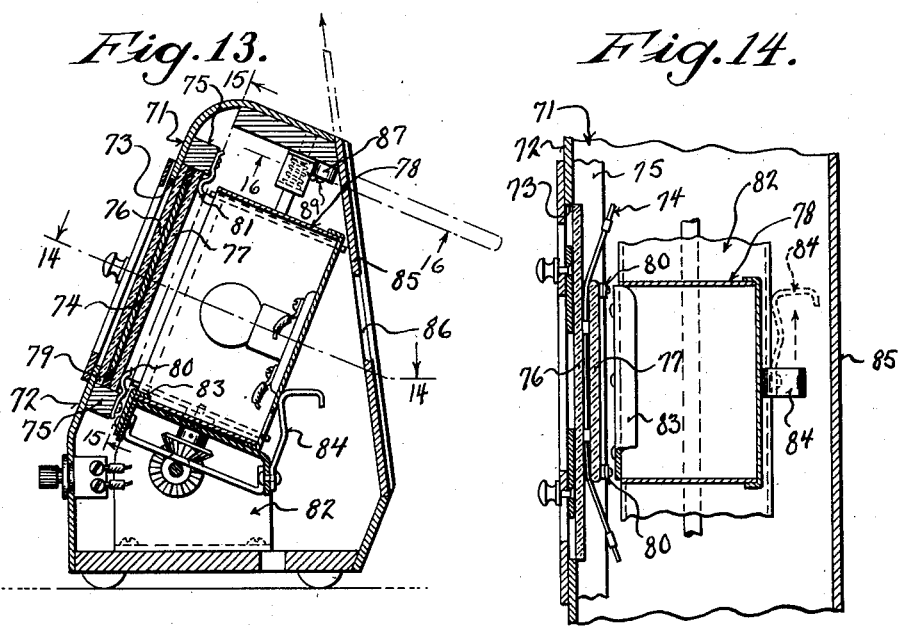
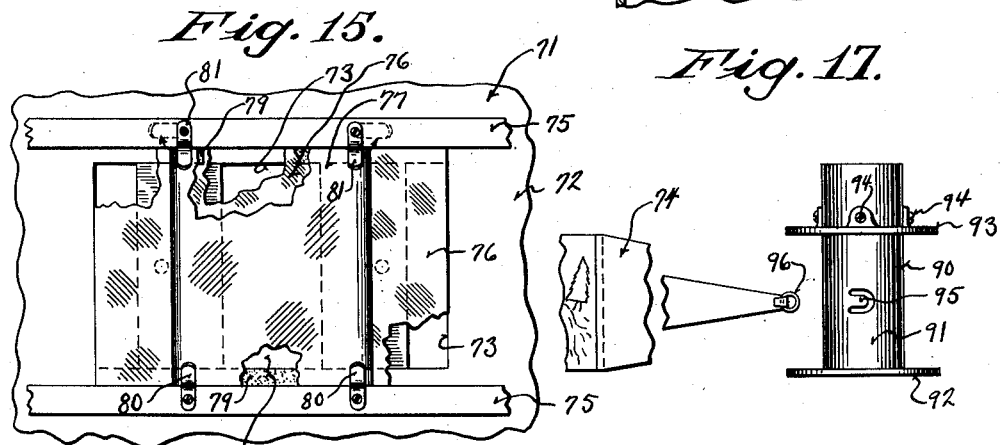
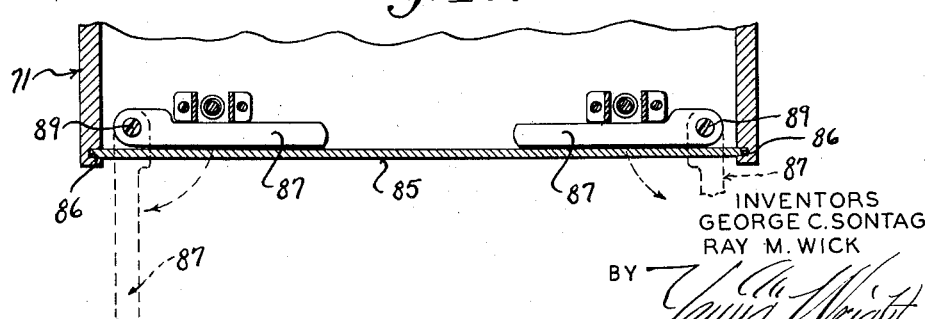
INVENTORS
GEORGE C. SONTAG
RAY M. WICK
BY 
ATTORNEYS Patented Jan. 30, 1951

2,539,676

UNITED STATES PATENT OFFICE 2,539,676

PHOTOGRAPH EXHIBITOR

George C. Sontag and Raymond M. Wick, Milwaukee, Wis.

Application February 14, 1947, Serial No. 728,442

2 Claims. (Cl. 40—93)

This invention appertains to exhibitors and more particularly to a novel means for displaying photographs in the home, one by one, to interested parties.

One of the primary objects of our invention is to provide means for preserving photographs against injury and in such a form that the same can be readily examined and exhibited in an attractive manner, without the necessity of individual handling the photographs or the pasting of the photographs in albums and the like.

Another salient object of our invention is to provide a machine or cabinet having a sight window with means for moving the photographs one by one past the window to display the same to the view of an observer.

A further object of our invention is to provide a light source in rear of the window and the photographs being exhibited, whereby the rays of light will emanate through the photographs and effectively and attractively illuminate the same.

A further important object of our invention is to provide means for securing the photographs, to be exhibited, together in a strip form, whereby the same can be wound upon a reel or spool; means being provided in the cabinet for receiving the spool and for paying the strip off of one spool on to another spool past the sight window.

Another further object of our invention is to provide a single means for selectively driving and rotating either one of the spools.

Another further important object of our invention is to provide means for regulating the active size of the sight window according to the dimensions of the photographs being exhibited.

A still further object of our invention is to provide novel means for constructing the cabinet, so that a portable projecting machine can be used therewith for throwing the image of the photograph appearing in rear of the sight window on a screen.

With these and other objects in view, the invention consists in the novel construction, arrangement, and formation of parts, as will be hereinafter more specifically described, claimed, and illustrated in the accompanying drawings, in which drawings:

Figure 4 is a longitudinal sectional view through the exhibitor taken substantially on the line 4—4 of Figure 5 looking in the direction of the arrows.

Figure 5 is a section taken substantially at right angles to Figure 4 and on the line 5—5 of Figure 4 looking in the direction of the arrows.

Figure 6 is a detail sectional view illustrating the spring clip employed for detachably holding the light casing in the cabinet.

Figure 7 is an enlarged detail side elevational view illustrating the picture strip and the means for detachably connecting one end of the strip to a spool.

Figure 8 is a longitudinal sectional view taken on the line 8—8 of Figure 7 looking in the direction of the arrows, the view illustrating the means for securing the photographs together to form the picture strip.

Figure 9 is a transverse sectional view through the picture strip taken on the line 9—9 of Figure 7 looking in the direction of the arrows.

Figure 10 is a fragmentary front elevational view of the cabinet showing another adjustment of the shutters for controlling the size of the sight window.

Figure 11 is a detail sectional view through the sight window showing the uppermost shutter, the section being taken on the line 11—11 of Figure 10 looking in the direction of the arrows.

Figure 12 is a detail sectional view through the front wall of the cabinet, the section being taken substantially on the line 12—12 of Figure 10 looking in the direction of the arrows.

Figure 13 is a transverse cross sectional view through another and preferred form of our exhibitor.

Figure 14 is an enlarged fragmentary sectional view through the second form of our exhibitor taken on the line 14—14 of Figure 13.

Figure 15 is an enlarged fragmentary detailed sectional view taken on the line 15—15 of Figure 13, looking in the direction of the arrows and illustrating the novel means employed for detachably supporting the window glasses and guides for the picture strip.

Figure 16 is a fragmentary horizontal sectional view taken on the line 16—16 of Figure 13 looking in the direction of the arrows illustrating in detail the feet or legs for supporting the exhibitor in its inclined position for receiving the projecting machine.

Figure 17 is a detailed view in elevation illustrating a preferred type of reel and picture strip.

Referring to the drawings in detail, wherein similar reference characters designate corresponding parts throughout the several views, the letter E generally indicates our novel photograph exhibitor.

Figure 1:
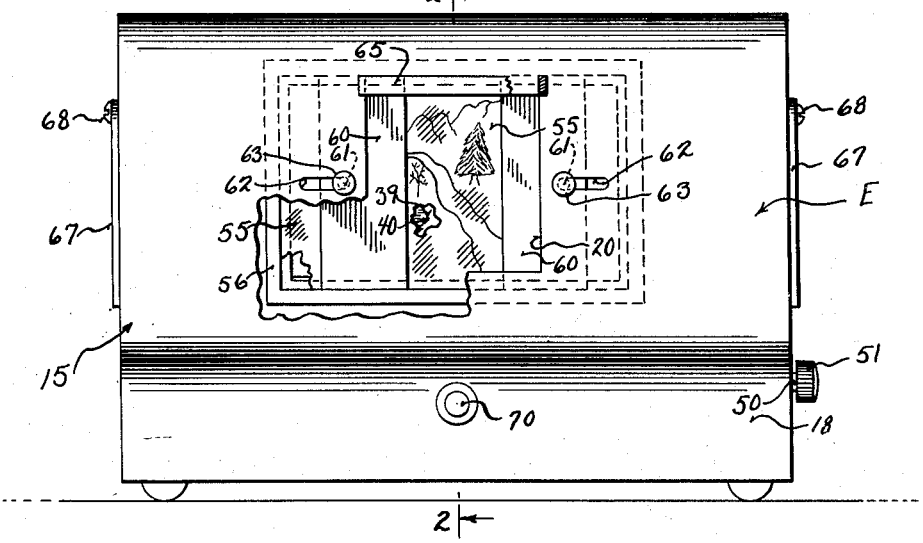
Figure 1 is a front elevational view of our novel exhibitor, parts of the view being shown broken away and in section.

This exhibitor E includes a cabinet 15 formed from any desired materials and it is proposed to construct the cabinet so that the same will present an attractive appearance to the eye. As illustrated, the cabinet includes a bottom wall 16, side walls 17, a front wall 18 and a rear wall 19. The major portion of the front wall 18 is preferably arranged at an angle to the vertical to provide an inclined face panel. This panel is provided at its central portion with a sight window 20 through which photographs, one by one, are to be exhibited. The rear wall 19 of the cabinet also includes a hinged door 21 whereby free access to the interior of the cabinet can be readily had. If desired, the cabinet can be braced internally in any desired fashion and we propose to utilize a top brace 22 for the upper end of the cabinet. This brace is secured to the top wall and the side walls and forms a stop for the hinged door 21 when the door is in its closed position.

Mounted within the cabinet is a supporting bracket 23. This bracket is of an inverted U-shape and can be readily stamped from sheet metal. The bracket includes a flat upper wall 24 and depending spaced parallel legs 25. The lower extremities of the legs carry feet 26 which are securely fastened to the bottom wall 16. This bracket forms a support and bearings for certain parts of the device, as will be more clearly later set forth. The bracket also forms a support for detachably supporting a light casing 27 in the cabinet in rear of the sight window. The light casing also functions as a guide for the picture strip as also will be later described.

Referring to the light casing itself, the same embodies top and bottom walls 28 and 29, a connecting rear wall 30 and side walls 31. The side walls 31 have their forward ends bent to provide U-shaped guide channels 32. These guide channels detachably receive a transparent panel 33. While it is proposed to make this panel 33 from clear glass, the same can be made in different colors and a selected colored glass panel can be used with certain photographs being exhibited. The edges of the U-shaped channels 32 carry arcuate guide flanges 34 and these flanges extend beyond the side walls 31 of the casing and form the guides for the picture strip.

The light casing can be detachably supported on the bracket in any preferred way, but we propose to strike out a resilient tongue 35 from the bottom wall 29 of the light casing at the forward end thereof. This tongue is adapted to be inserted in a slot 36 formed in the upper wall 24 of the supporting bracket 23. The lower wall 29 of the casing adjacent to its rear end is provided with spaced keeper openings 37 and these openings are adapted to receive upstanding resilient snap clips 38 carried by the top wall 24 of the bracket.

As stated, in the object of this specification, our device is utilized for exhibiting photographs one after the other past the sight window and in order to facilitate the exhibition of the photographs, a plurality of photographs 39 of a like size are selected and these photographs are secured in edge to edge relation to form a picture strip 40. The photographs can be secured together by pieces of adhesive tape 41 as is clearly shown in Figures 7, 8 and 9. In order to complete the picture strip, the ends of the strip have secured thereto, by a suitable adhesive, tapered end tabs 42. These tabs, at their terminals, carry hooks 43. The hooks can be placed in a selected opening of a plurality of openings 44 formed in the body of receiving reels or spools 45.

In actual practice, a picture strip is wound upon one spool 45 and when the photographs constituting the strip are being exhibited, the strip is paid off of this reel on to a second reel. Means is provided for detachably and rotatably supporting the reels in the cabinet on each side of the light casing.

The means for supporting the reels consists of a pair of lower spindles 46 and these spindles are rotatably carried by the top wall 24 of the bracket 23 in spaced relation to one another. The spindles are adapted to be inserted in the lower ends of the spool and for driving engagement with said spools similar to the mounting provided for films in cameras. In the present instance, the upper ends of the spindles are of a polygonal shape in cross section and are received in similar shaped openings in the lower ends of the spools (see Figure 8). The lower ends of these spindles have attached thereto for movement therewith beveled gears 47.

Mounted directly above the spindles 46 are spring pressed plungers 48 which are adapted to engage and hold the upper ends of the reels or spools. These spring pressed plungers 48 are carried by the brace bar 22 and suitable brackets 49 carried by said brace bar. Obviously, by lifting up on the spring pressed plungers, the same can be moved from out of engagement with the spools and the spools can be then lifted off of the spindles 46.

Rotatably and slidably supported by the legs 25 of the bracket 23 is a drive shaft 50. One end of the shaft also slidably and rotatably extends through one end wall 17 of the cabinet and this end of the shaft can be provided with a turning knob 51. Keyed or otherwise fastened to the shaft 51 for movement therewith is a pair of spaced face beveled pinions 52. By sliding the shaft longitudinally one pinion or the other can be brought into driving meshing engagement with a selected pinion 47 for the reels or spools. In order that the shaft will be held against accidental sliding movement in either one of its selected positions, a spring pressed detent 53 is carried by the bracket 23 for engaging in either one of a pair of annular grooves 54 formed in the shaft. By turning the shaft the desired spool can be rotated.

Attention is also called to the fact that a transparent glass panel 55 is carried by the cabinet in rear of the sight opening 20 and this panel is detachably mounted in a frame 56 secured to the rear face of the front wall 18 of the cabinet. The panel 55 is arranged in front of the panel 33 and the picture strip moves between these panels and the panels function as a guide therefor. The flanges 34 of the light casing guide the picture strip to and from the glass panels.

In use of our exhibitor, a picture strip is wound upon a reel and this reel is placed in the cabinet on one side of the light casing and the strip is threaded by hand between the glass panels 33 and 55 and the strip is then hooked to the reel or spool on the other side of the light casing. The shaft 50 is then slid so that one pinion 52 will mesh with the pinion of the last mentioned spool. By turning the shaft in the desired direction, the picture strip will be pulled off of the first reel and wound up on the second reel. After all the photographs in the strip have been exhibited, the shaft can be shifted so that the other pinion 52 will mesh with the pinion of the first reel and by turning the shaft in the same direction, the picture strip can be rewound on its original spool.

Mounted within the casing is a lamp socket 57 for receiving an electric light bulb 58 and the bulb and socket are preferably disposed directly in rear of the transparent panel 33. Current is supplied to the bulb from any suitable source and electric feed and return wires 59 can be led from the socket 57 out of the casing.

To facilitate the best showing of different size photographs, means is provided for regulating the active size of the sight window 20. This means includes sliding side shutters 60. The shutters are confined between the front face of the glass panel 55 and the rear face of the front wall 18 of the cabinet. Each shutter can be provided with a stem 61 which is slidably received in a slot 62 formed in said front wall. The stems can be provided with finger pieces 63 to facilitate the movement of the shutters toward and away from one another. The shutters 60 are employed for regulating the width of the sight opening. A removable top shutter 64 is employed for regulating the height of the sight window and this top shutter is freely mounted in a loop 65 carried by the outer face of the cabinet directly above the sight window. This loop also functions as a stop, for a purpose which will now be set forth.

The cabinet is so designed as to permit the use thereof with a projecting machine 66. The machine 66 is of a well-known type now found in the open market and photographs and drawings to be exhibited are placed under the projector and the image of such photographs or drawings is thrown upon a screen.

When our exhibitor E is to be used with the projector, the cabinet 15 is tilted rearwardly, so that the front wall 18 thereof will be disposed in a substantially horizontal plane. The cabinet can be held in such a position by legs 67 which are pivoted, as at 68, to the outer faces of the side walls 17 of the cabinet. Stops 69 are provided for limiting the swinging movement of the legs and the lower rear corner of the cabinet itself is preferably flattened, so that the same can rest firm on a support.

When the cabinet is in its tilted position, the projecting machine 66 can be placed over the sight window against the loop 65. The loop then functions as an accurate stop for positioning the projector on the cabinet. The strip can be actuated, the same manner as previously described, to bring the photographs one by one under the projector.

A switch 70 can be supported by the cabinet for turning the lamp in the light casing off and on.

Figure 2:
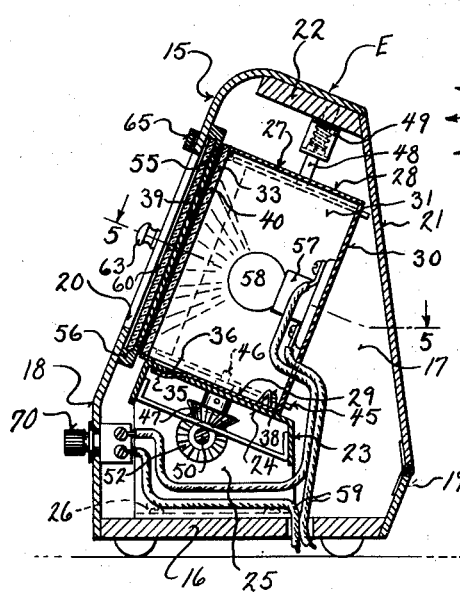
Figure 2 is a transverse sectional view through the exhibitor taken on the line 2—2 of Figure 1 looking in the direction of the arrows.
Figure 3:
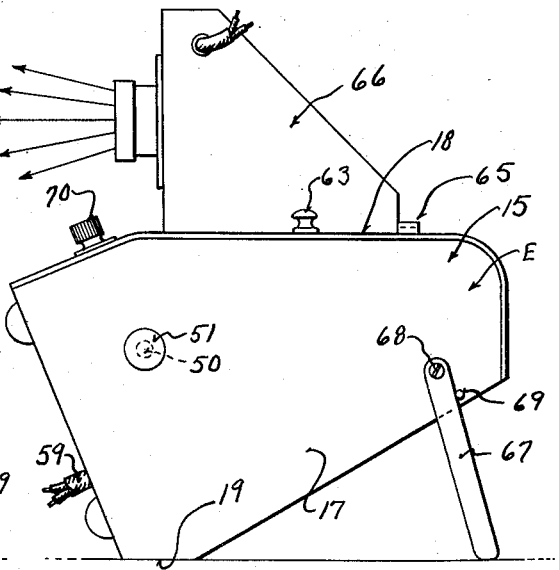
Figure 3 is an end elevational view showing our exhibitor in its tilted position and with a projecting machine mounted thereon over the sight window.

In Figures 13–17 inclusive, we have illustrated another and preferred form of our invention and this form follows very closely that form illustrated in Figures 1–12 inclusive; the difference residing more particularly in the means for detachably supporting the light casing in position, the means employed for detachably supporting the combined sight and guide glasses in position, the arrangement for associating the legs with the cabinet and in the spools.

As illustrated in these figures, we provide a cabinet 71, the front wall 72 of which is provided with a sight window 73 past which the picture strip 74 is moved, by the means illustrated and described in the first form.

Secured to the inner face of the front wall 72 above and below the sight windows 73 are supporting strips 75. These strips detachably receive and support the transparent panel 77 for the light casing 78. It is to be noted that the panel 77 is of a considerable less length than the front transparent panel or glass 76 and that its end edges are rounded or beveled as at 78. The panels 76 and 77 are held in a preferred spaced relation by cushioning spacer strips 79 and this space allows the travel of the picture strip between the panels and the panels form an effective guide therefor. The rounded edges 78 facilitate the travel of the strip to and from the panels.

To detachably hold the panels in position, the lower supporting strip 75 carries resilient clips 80 which press against the panel 77. The uppermost strip 75 carries similar clips 81. These clips 81 can be swung parallel to the upper strip and away from the panels, so that the panels can be easily removed for cleaning and replacement.

Arranged within the cabinet below the sight window is the inverted U-shaped supporting bracket 82 and this bracket carries the operating mechanism for the spools. At the front central portion of the bracket 82 is a lip 83 and the lower wall of the light casing 78 is adapted to be slipped under this lip and against the upper surface of the bracket when the light casing is placed in its operative position. A resilient latch 84 is pivotally carried by the rear of the bracket 82 and can be swung into and out of engagement with the rear wall of the light casing to insure the proper holding of the light casing in place.

In this form, of our invention, we prefer to provide a detachable sliding section 85 for the rear wall of the cabinet so that access can be readily had into the interior of the cabinet and the end walls of the cabinet can be provided with guide grooves 86 for receiving this section 85.

As in the first form, supporting legs 87 are provided for holding the cabinet in its tilted position when the pictures are being provided and these legs can be arranged within the cabinet and mounted upon pivot pins 89 carried by the top wall of the cabinet. By removing the sliding section 85 of the rear wall, the legs 87 can be swung out.

It is essential that the spools closely conform to the width of the picture strip 74 and spools 90 can be provided with each different width of picture strip. As illustrated in Figure 17, the spool 90 is provided with a hub 91 and flanges 92 and 93. The flange 93 is secured to the hub in correct spaced relation to the flange 92 by suitable fastening elements, such as screws 94. The hub 91 can have formed therein a tongue 95 for detachably receiving a loop or eye 96 on the end of the picture strip.

Changes in details may be made without departing from the spirit or scope of our invention, but what we claim as new is:

1. A machine for exhibiting photographs and the like comprising a cabinet having a substantially flat lower wall, a front wall provided with a sight opening, a rear wall, said front wall having a portion thereof arranged at an incline to the vertical, and said cabinet having a flat portion for resting on a surface at the juncture of the rear wall with the bottom wall disposed in spaced parallel relation to that part of the front wall disposed at an incline to the vertical, said cabinet being adapted to be disposed in selected positions with the bottom wall on a support or with the flat portion on a support to dispose said part of the front wall in a horizontal plane, and legs carried by said cabinet for supporting the cabinet with the front wall in a horizontal plane in conjunction with said flat portion.

2. A machine for successively exhibiting one photograph after another comprising a cabinet having a bottom wall and a front wall provided with a sight opening, a substantially inverted U-shaped bracket including a top wall and depending side legs, means securing the legs to the bottom wall, a light casing disposed in rear of the sight opening secured to the top wall of the bracket, reels rotatably carried by the top wall, an exhibiting strip on said reels movable past the light casing and the sight window, an operating shaft for the reels rotatably carried by the legs of the bracket, means for turning the shaft, and means operatively connecting the shaft with the reels.

GEORGE C. SONTAG.
RAYMOND M. WICK.

REFERENCES CITED

The following references are of record in the file of this patent:

UNITED STATES PATENTS

| Number | Name | Date |
|---|---|---|
| 98,773 | Jeffers | Jan. 11, 1870 |
| 181,256 | Ficht | Aug. 22, 1876 |
| 729,736 | Collamere | June 2, 1903 |
| 1,690,244 | Periale | Nov. 6, 1928 |
| 1,752,614 | Ring | Apr. 3, 1930 |
| 1,988,654 | Haag | Jan. 22, 1935 |
| 2,271,296 | Hargrave | Jan. 27, 1942 |
| 2,324,453 | Albers | July 13, 1943 |